June 12, 1934.  G. A. MacDONALD  1,962,826
PARTITION PANEL JOINT
Filed March 10, 1931  2 Sheets-Sheet 1
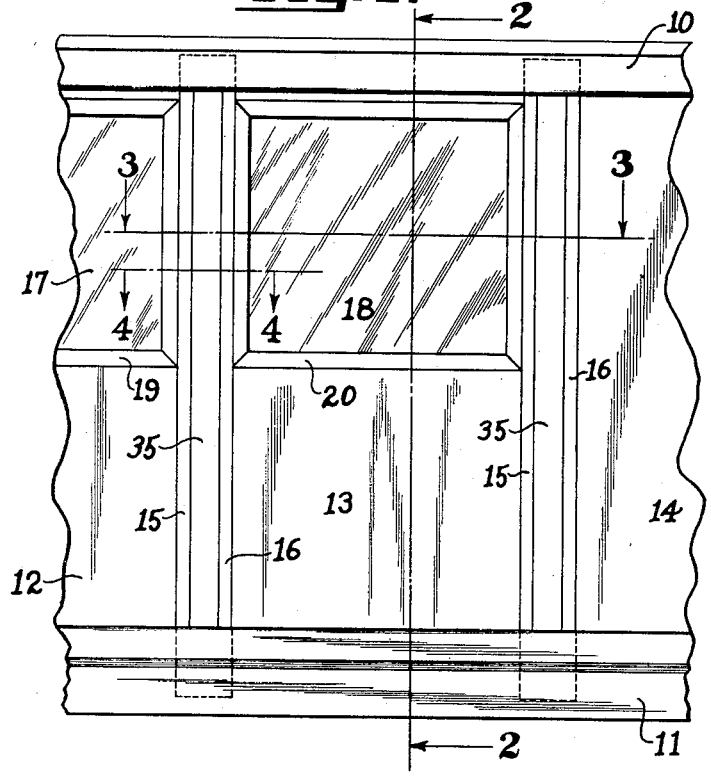
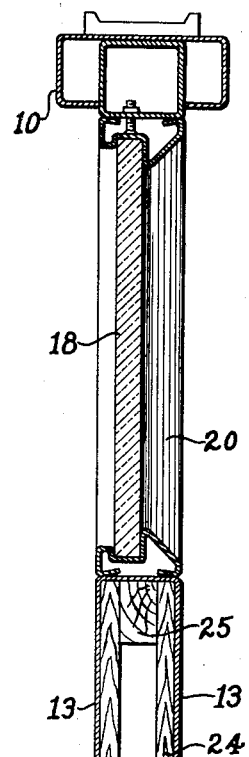
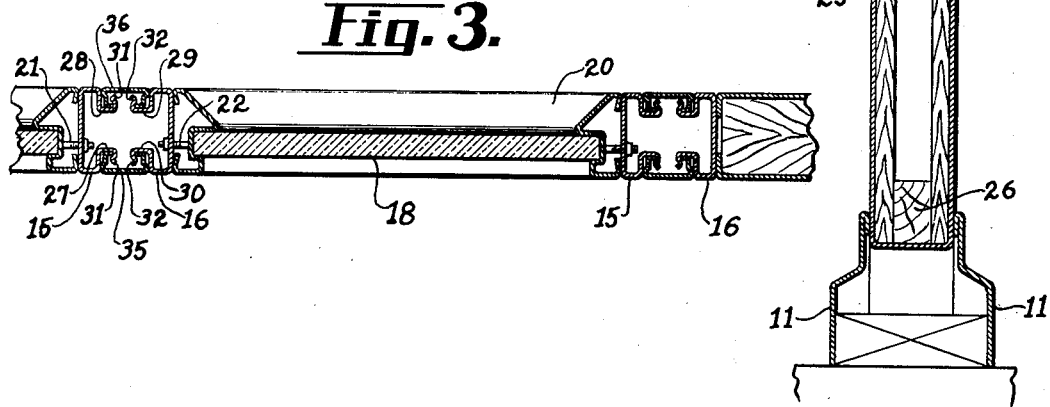
INVENTOR
*Gerald A. MacDonald*
BY HIS ATTORNEY
*H. G. Manning*

June 12, 1934.  G. A. MacDONALD  1,962,826
PARTITION PANEL JOINT
Filed March 10, 1931  2 Sheets-Sheet 2

INVENTOR
Gerald A. MacDonald.
BY HIS ATTORNEY
H. G. Manning

Patented June 12, 1934

1,962,826

UNITED STATES PATENT OFFICE 1,962,826

PARTITION PANEL JOINT

Gerald A. MacDonald, New Britain, Conn., assignor to The Hart & Hutchinson Company, New Britain, Conn., a corporation of Connecticut Application March 10, 1931, Serial No. 521,438

13 Claims. (Cl. 189—34)

This invention relates to building constructions, and more particularly to a joint for a pair of adjacent partition panels, comprising a pair of channel-shaped stile members secured to the panels, and a snap-action locking channel member adapted to detachably connect said stile members.

One object of this invention is to provide a panel joint construction of the above nature in which the locking channels, when snapped into position, will be flush with the walls of the stile members to which they are connected.

A further object is to provide a pair of channel-shaped stile members having locking S-shaped flanges adapted to cooperate with L-shaped flanges on the locking channel member, all of said flanges being entirely concealed from view behind the locking channel members when the joint is assembled.

A further object is to provide a snap lock partition joint of the above nature which will be light-and-air-tight, and which may be readily assembled and taken down without injury to the parts thereof.

A further object is to provide a partition panel joint of the above nature which will be simple in construction, inexpensive to manufacture, easy to assemble, compact, ornamental in appearance, and very efficient and durable in use.

With these and other objects in view there has been illustrated on the accompanying drawings, one form in which the invention may be conveniently embodied in practice.

In the drawings:

Fig. 1 represents a fragmentary view in elevation of a partition made up of three panels joined together by a pair of the improved partition joints forming the subject of the present invention.

Fig. 2 is an enlarged sectional view taken along the line 2—2 of Fig. 1, looking in the direction of the arrows.

Fig. 3 is a sectional view taken along the line 3—3 of Fig. 1, looking in the direction of the arrows.

Figure 4:
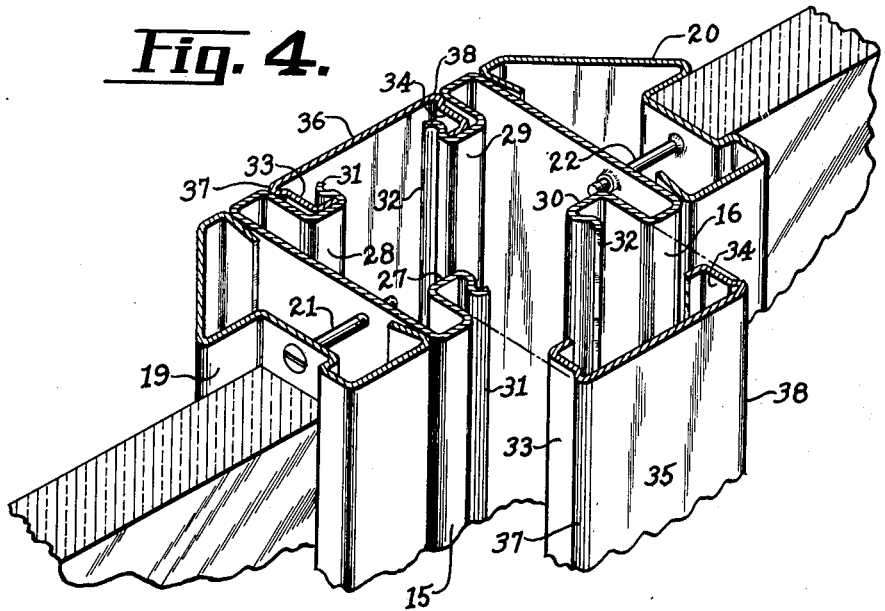
Fig. 4 is a perspective sectional view taken along the line 4—4 of Fig. 1.

Referring now to the drawings in which like reference numerals denote corresponding parts throughout the several views, the numerals 10 and 11 indicate the upper and base molding sections at the top and bottom of a room. The molding sections 10 and 11 are adapted to be connected by a partition comprising a plurality of rectangular panels 12, 13, and 14, the adjacent edges of the latter being secured to upright channel-shaped stile members 15 and 16, adapted to be attached to said panels at the factory.

As herein shown, the upper portions of the panels 12 and 13 are provided with window sashes 17 and 18, having frames 19 and 20 which are connected to said stile members 15 and 16 as by bolts 21 and 22, as shown.

The panels 12, 13 and 14 are preferably formed of hollow construction, being reinforced on the interior by any suitable filling material, such as wall boards 23 and 24, and joists 25 and 26, arranged as shown in Fig. 2.

In order to detachably join the panels 12, 13 and 14 together, the stile members 15 and 16 are provided on their inner opposing faces with S-shaped flanges 27, 28, 29 and 30, said flanges having outwardly-extending curved beaded inwardly offset extremities 31 and 32 which are adapted to cooperate with L-shaped flanges 33 and 34 on a pair of U-shaped snap-action locking channels 35 and 36, as most clearly shown in Figs. 3 and 4. The inwardly extending legs of the L-shaped flanges 33 and 34 are offset slightly to provide rounded corner ribs 37 and 38. By means of this construction, when the locking channels 35 and 36 are assembled in position, the upstanding extremities of the L-shaped flanges 33 and 34 will snap under the beaded extremities 31 and 32 of the S-shaped flanges 27, 28, 29 and 30 and the corner ribs 37 and 38 will frictionally engage with the adjacent edges of the stile members 15 and 16 to form a rigid, flush construction.

Operation

In operation, when it is desired to assemble the panels 12, 13 and 14 to form a wall partition, said panels will first be arranged vertically with their attached stile members 15 and 16 adjacent one another. The locking channel members 35 and 36 will then be arranged vertically with their L-shaped flanges 33 and 34 in alinement with the open recesses of the S-shaped flanges of the stile members 15 and 16, as shown at the right in Fig. 4. The locking channels 35 and 36 will then be pushed in a horizontal direction toward each other until they have snapped into the positions shown in Fig. 3.

One advantage of the present invention is that the partition panels may be readily assembled on the job without the use of screws, bolts, lugs, clips, studs, or other mechanical fastening devices.

While there has been disclosed in this specification one form in which the invention may be embodied, it is to be understood that this form is shown for the purpose of illustration only, and that the invention is not to be limited to the specific disclosure, but may be modified and embodied in various other forms without departing from its spirit. In short, the invention includes all the modifications and embodiments coming within the scope of the following claims.

Having thus fully described the invention what is claimed as new and for which it is desired to secure Letters Patent is:

1. In a building partition, a pair of rectangular panels arranged side by side, said panels having opposed open channel members attached to their adjacent edges, said open channel members having beaded edges and a pair of front and rear locking channel members adapted to be snapped inwardly into interlocking engagement with said tongues for detachably joining said panels, the outer surface of said locking channel members being flush with the edges of said open channel members.

2. In a building partition, a pair of rectangular panels arranged side by side, said panels having opposed open channel members attached to their adjacent edges, and a pair of front and rear locking channel members adapted to be snapped inwardly into interlocking engagement with said open channel members for detachably joining said panels, said open channel members having S-shaped flanges on their edges, the extremities of said flanges being beaded.

3. In a building partition, a pair of rectangular panels arranged side by side, said panels having opposed open channel members attached to their adjacent edges, said members having grooved flanges, and a pair of front and rear exterior locking channel members having L-shaped flanges adapted to be snapped inwardly into interlocking engagement with the grooves of said open channel members for detachably joining said panels.

4. In a building partition, a pair of rectangular panels arranged side by side, said panels having opposed open channel members attached to their adjacent edges, and a pair of front and rear locking channel members adapted to be snapped inwardly into interlocking engagement with said open channel members for detachably joining said panels, said open channel members having S-shaped flanges on their edges, said locking channel members having L-shaped flanges on their edges.

5. In a building partition, a pair of panels arranged side by side, said panels having opposed open channel members attached to their adjacent edges, the flanges of said members having grooves and beads and a pair of front and rear locking channel members adapted to be snapped inwardly into said open channel members for detachably joining said panels, the flanges of said locking channel members having flanges to snap into said grooves and behind said beads.

6. In a building partition, a pair of panels arranged side by side, said panels having opposed open channel members attached to their adjacent edges, the flanges of said members having grooves and beads and a pair of front and rear locking channel members adapted to be snapped inwardly into said open channel members for detachably joining said panels, the flanges of said locking channel members having L-shaped flanges to snap into said grooves and behind said beads.

7. In a building partition, a pair of panels arranged side by side, said panels having opposed open channel members attached to their adjacent edges, a pair of front and rear locking channel members adapted to be snapped inwardly into said open channel members for detachably joining said panels, the edges of said open channel members having S-shaped beaded flanges, and the edges of said locking channel members having L-shaped flanges to snap behind said beaded flanges.

8. In a building partition, a pair of panels arranged side by side, said panels having opposed open channel members attached to their adjacent edges, a pair of front and rear locking channel members adapted to be snapped inwardly into said open channel members for detachably joining said panels, the edges of said open channel members having S-shaped beaded flanges, and the edges of said locking channel members having L-shaped flanges to snap behind said beaded flanges, the flanges on said locking channel members being inwardly offset to provide rounded corner ribs for tightly wedging against the outer edges of the open recesses of said S-shaped flanges.

9. In a joint for a pair of adjacent panels of a building partition, a pair of channel-shaped open stile members for permanent attachment to said panels, said members having flanges with outwardly open grooves, and a pair of locking channel members having inwardly extending ribs for interlocking engagement with the grooves of said open stile members, said locking channel members lying flush with said stile members and panels when in assembled position, said channel members serving to lock said stile members together.

10. In a building partition, a pair of panels arranged side by side, said panels having opposed open channel members attached to their adjacent edges, a pair of front and rear locking channel members adapted to be snapped inwardly into said open channel members for detachably joining said panels, the edges of said open channel members having flanges provided with wedge-shaped recesses, and the edges of said locking channel members having L-shaped flanges to interlockingly fit into said recesses.

11. In a joint for a pair of adjacent panels, a pair of channel-shaped open stile members having bases adapted to be permanently attached to said panels, and a pair of locking channel members to cover the space between said stile members, said open stile members and said locking members having interlocking flanges provided with grooves and ribs, said locking members lying flush with said stile members.

12. In a building partition, a pair of panels arranged side by side, open channel members connected to said panels, said members having outwardly open grooves with inturned extremities, and a pair of locking channel members to cover the space between said open members provided with offset flanges adapted to fit into said groove and to interlock with said inturned extremities.

13. In a building partition, a pair of rectangular panels arranged side by side, said panels having opposed open channel members attached to their adjacent edges, said open channel members having grooves and beaded edges, and a pair of front and rear locking channel members adapted to be snapped inwardly into said grooves and into interlocking engagement with said beaded edges for detachably joining said panels, said locking channel members having angular flanges.

GERALD A. MacDONALD.